United States Patent
Cantineau et al.

(10) Patent No.: US 6,412,855 B1
(45) Date of Patent: Jul. 2, 2002

(54) OVERMOULDED REINFORCED METAL/PLASTIC COMPOSITE FRONT PANEL FOR MOTOR VEHICLE

(75) Inventors: Eric Cantineau, Paris; Jacques Sigonneau, Theuvy Acheres; Jean-Nicolas Guyomard, Le Mesnil Fuguet, all of (FR)

(73) Assignees: Valeo Thermique Moteur, La Verriere Cedex; Valeo Vision, Bobigny, both of (FR)

( * ) Notice: Subject to any disclaimer, the term of this patent is extended or adjusted under 35 U.S.C. 154(b) by 0 days.

(21) Appl. No.: 09/555,432
(22) PCT Filed: Sep. 28, 1999
(86) PCT No.: PCT/FR99/02304
§ 371 (c)(1),
(2), (4) Date: May 25, 2000
(87) PCT Pub. No.: WO00/18635
PCT Pub. Date: Apr. 6, 2000

(30) Foreign Application Priority Data

Sep. 30, 1998 (FR) .............................. 98 12232

(51) Int. Cl.[7] .............................................. B60R 27/00
(52) U.S. Cl. ...................................... 296/194; 296/188
(58) Field of Search ................................ 296/188, 189, 296/194, 197, 30, 203.02; 248/232; 180/68.4

(56) References Cited

U.S. PATENT DOCUMENTS

| 5,190,803 | A |   | 3/1993  | Goldbach et al. |
|-----------|---|---|---------|-----------------|
| 5,580,122 | A | * | 12/1996 | Muehlhausen .............. 296/194 |
| 5,658,041 | A | * | 8/1997  | Girardot et al. ............ 296/194 |
| 6,186,583 | B1 | * | 2/2001 | Martin ....................... 296/194 |
| 6,196,624 | B1 | * | 3/2001 | Bierjon et al. ......... 296/203.02 |
| 6,216,810 | B1 | * | 4/2001 | Nakai et al. ................ 296/194 |
| 6,273,496 | B1 | * | 8/2001 | Guyomard et al. ......... 296/194 |

FOREIGN PATENT DOCUMENTS

| EP | 0 370 342 | 5/1990 |
| EP | 0 658 470 | 6/1995 |
| FR | 2 761 331 | 10/1998 |

* cited by examiner

*Primary Examiner*—Stephen T. Gordon
*Assistant Examiner*—Jason Morrow
(74) *Attorney, Agent, or Firm*—Morgan & Finnegan, LLP.

(57) ABSTRACT

The invention concerns a front panel comprising a top metal section extending over the whole width of the panel and provided with means for fixing it to the motor vehicle structural elements, and at least a central jamb including means to be fixed to a hood lock and a cowl-beam of the vehicle. The section and the jamb are mechanically interlocked to form a single-unit assembly, said assembly being overmoulded with a plastic element of the front panel.

4 Claims, 1 Drawing Sheet

OVERMOULDED REINFORCED METAL/PLASTIC COMPOSITE FRONT PANEL FOR MOTOR VEHICLE

BACKGROUND OF THE INVENTION

The present invention relates to a metal/plastic composite front panel for a motor vehicle.

Such a panel is a structural element of the vehicle which is capable of incorporating various items of equipment of the vehicle, such as headlamps, direction indicators, horn, heat exchanger, electric fan unit or entire cooling module, etc.

The front panel, provided in this manner with these items of equipment, forms a single-unit assembly prepared and delivered by the equipment supplier, which is ready to be mounted on the vehicle by the manufacturer.

The mounting of this module is performed by connection to lateral structural elements of the vehicle, such as side members, wings or body-frame, then positioning a bumper or front shield mounted on the module.

As a panel structure which is made entirely of plastic material does not enable the safety requirements of the crash tests to be complied with, for the structure of the front panel it is necessary to combine elements made of plastic material (for lightness and low manufacturing cost) and metal elements (for mechanical strength). The method that is currently used consists of producing a section from a deep-drawn sheet and mounting it onto a plastic support by screwing or rivetting fixing sleeves.

In addition to this section, the panel comprises a central metal jamb comprising at its lower end a hole for fixing it to the beam of the shield or of the bumper of the vehicle. At its other end, the jamb is provided with a system for fixing it to the bonnet lock of the vehicle. The jamb thus ensures, with the bonnet closed, the mechanical connection between bonnet and shield to contribute to the overall rigidification of the structure of the vehicle.

The mounting of this jamb is usually performed by screwing together the bonnet lock and the jamb, with the interposition of a part of the panel, so as to interlock these three elements.

However, in this configuration, the connection between the panel and the jamb remains dismountable, so that a user of the vehicle may, for example after adjusting the lock, forget to reset all its fixing points, thus reducing the strength of the vehicle in the event of an accident.

BRIEF SUMMARY OF THE INVENTION

One of the objects of the present invention is to remove this drawback, by proposing a front panel structure incorporating the central jamb which guarantees the overall mechanical strength and dispenses with dismountable assemblies.

The front panel of the invention is a composite panel of the known type, comprising a top metal section extending over the whole width of the panel and provided with means for fixing it to structural elements of the vehicle, as well as at least a central jamb comprising means for fixing to a bonnet lock, on the one hand, and a shield beam of the vehicle, on the other hand.

According to the invention, the section and the jamb are mechanically interlocked to form a single-unit assembly, said assembly being overmoulded with a element made plastic material of the panel.

The element made of plastic material advantageously comprises vertical ribs for strengthening the section.

The section and the jamb may be joined before overmoulding the plastic element, in particular by clinching, welding or rivetting, or in addition during the overmoulding process, in particular by clinching.

BRIEF DESCRIPTION OF THE DRAWINGS

Other characteristics and advantages of the invention will become apparent from the detailed description of an exemplified embodiment below, given with reference to the attached drawings.

DETAILED DESCRIPTION OF THE INVENTION

Figure 1:
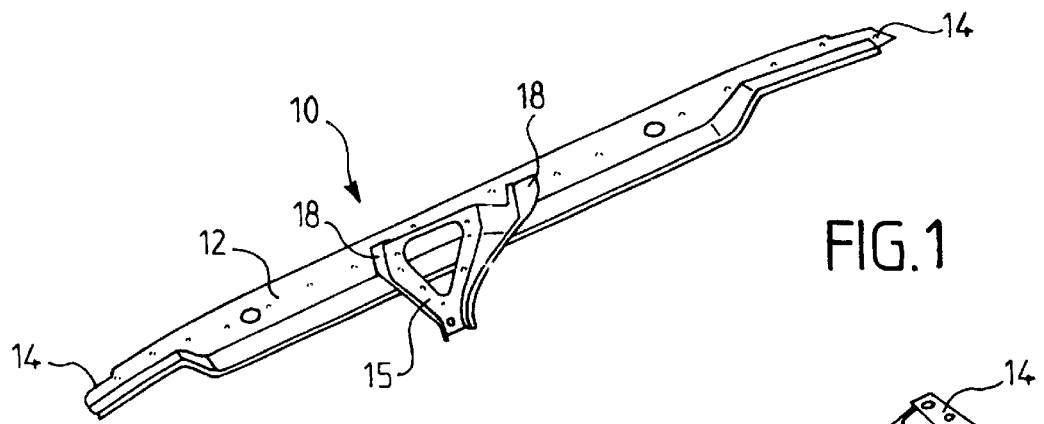
FIG. 1 represents in a front perspective view, the metal part of the front panel according to the invention, before overmoulding the plastic material.

FIG. 1 shows the metal element 10 of a metal/plastic composite panel according to the invention. The metal element comprises a transverse section 12 provided at its ends with holes 14 for fixing to side members or to wings of the vehicle, so as to guarantee the mechanical strength of the frame of the latter. This section may be produced, for example, by punching and deep-drawing a sheet to the desired shape.

The element 10 also comprises a central jamb 15 comprising at its lower free end a hole 16 for fixing it to the beam of the shield or of the bumper of the vehicle. At its other end, the jamb 15 is fixed in a non-detachable manner at 18 to the section 12. This fixing may be achieved by various known methods, for example by welding, rivetting or clinching (plastic deformation of one of the parts so as to fill by planishing a matching dovetail-shaped blank of the other part).

Figure 2:
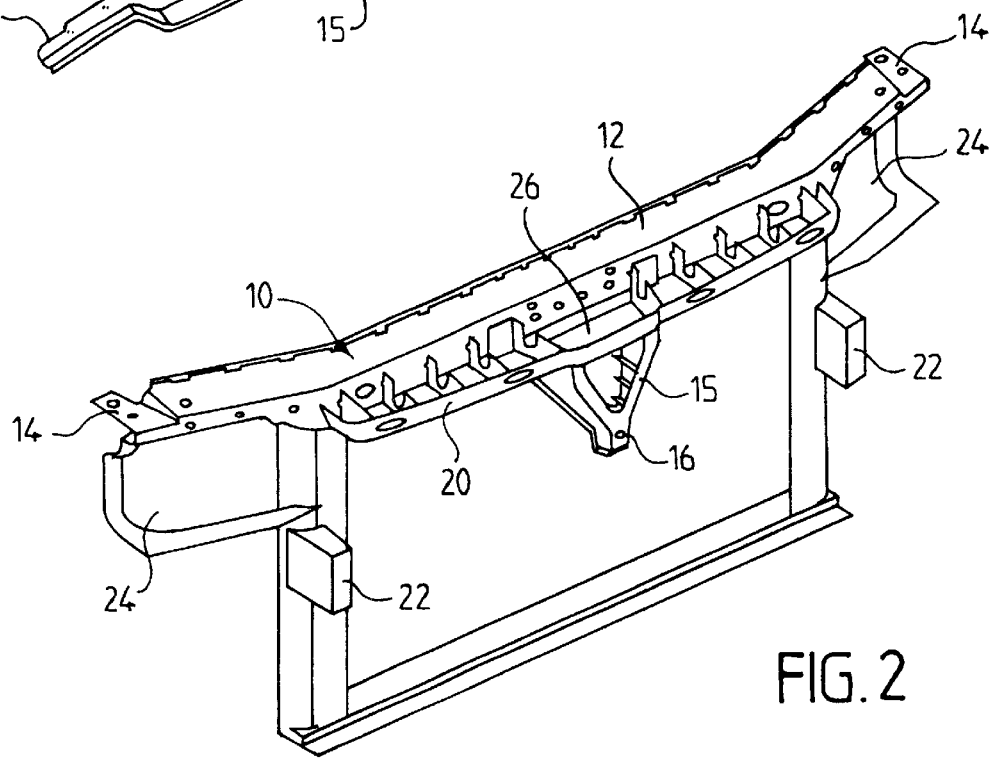
FIG. 2 represents, also in a front perspective view, the finished panel, after overmoulding the plastic material.
Figure 3:
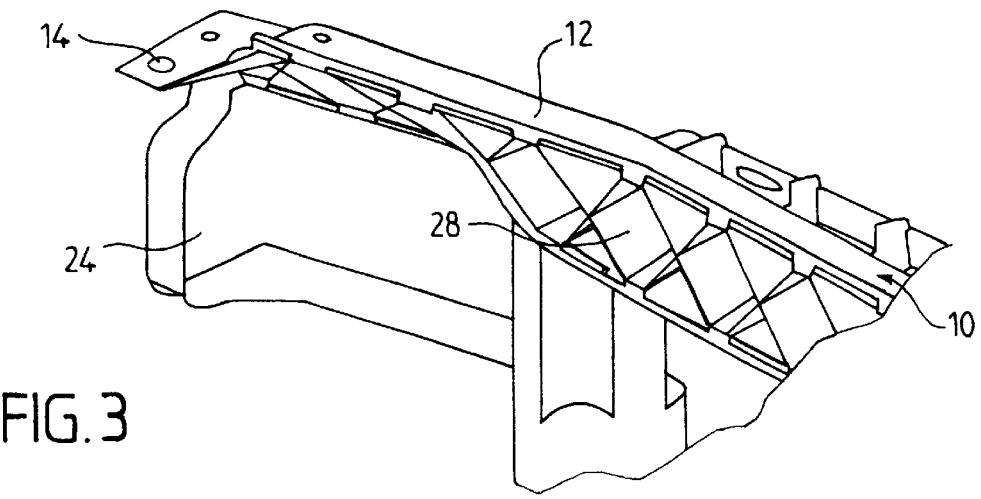
FIG. 3 represents in a rear perspective view one of the lateral ends of the panel of FIG. 2, illustrating in particular the penetration between the metal element and the plastic material.

The metal part 10 produced in this manner is then overmoulded by a plastic material, to obtain the front support illustrated in FIGS. 2 and 3.

For this overmoulding, one may use, for example, the method for producing a metal/composite element disclosed in EP-A-0 370 342, which teaches perforating a "shell", or thin-walled metal element (metal part 10, herein) at discrete locations such that when the plastic overmoulding is injected around the metal part, the injected plastic passes through the perforations.

This enables a thin-walled metal element, or "shell", to be used which can be manufactured from sheet metal using the deep-draw process. Untreated, zinc-coated steel sheets and/or steel sheets provided with a primer and, optionally, an adhesion-promoter; untreated, anodized aluminum sheets and/or aluminum sheets provided with a primer and optionally an adhesion-promoter are particular suitable.

Partially crystalline plastics, such as glass-fiber reinforced polyamide 6, polyamide 6, 6, polybutylene terephthalate, polyphenylene sulphide or propylene are particularly suitable as plastics for injecting on the reinforcing ribs.

In particular, a thermosetting or thermoplastic synthetic material such as a glass-fibre reinforced polyamide (of course this choice is in no way restrictive) can be used by moulding by injection under pressure.

The overmoulded element comprises a longitudinal portion 20 that comes to surround the metal element 10. It comprises, in a manner known per se, structural parts such as 22 for fixing to the beam of the shield besides the fixing to point 16 of the jamb 15, or in addition such as 24, which are able to receive headlamp units, or in addition a seat 26 for a bonnet lock integral with the metal element 10.

The plastic structure also comprises a system of ribs such as 28 which enables the rigidity of the section 12 to be increased. Similarly, the jamb 15 may comprise a system of ribs enabling its rigidity to be increased.

It will be noted, as illustrated, that the metal element 10 is only partially embedded in the plastic material so as to leave certain parts of the section or of the jamb projecting, in particular those comprising holes for connection to other members of the vehicle.

Thus a panel is obtained that comprises a non-dismountable, integrated central jamb 15, that enables the drawbacks of mounted jambs of the panel structures that have been proposed until now to be removed.

Various refinements of this structure may of course be considered without departing from the scope of the invention.

Thus, the section 12 may be produced in one or two parts, as a function of the design choices for the vehicle. Moreover, the connection between the jamb 15 and the section 12 may be performed before overmoulding as well as during overmoulding (for example by clinching to the interior of the overmoulding mould, then injection of the plastic material).

With respect to the fixing of the bonnet lock, it can be performed on one of the elements, section 12 or jamb 15, or on both at the same time.

Of course, in addition to the central jamb 15, other support elements can be integrated in the panel according to the same principle, for example by lateral fastening lugs, additional jambs, etc., here too the metal parts all being joined to one another then overmoulded to form a non-demountable unit.

What is claimed is:

1. A metal/plastic composite panel for a motor vehicle, comprising a top metal section extending over the width of the panel and provided with means for fixing it to structural elements of the vehicle, and at least a central jamb comprising an elongated, substantially vertical member having first and second ends; said first end of said central jamb mechanically interlocked and in non-dismountable contact with said section to form a single-unit assembly, and said second end of said central jamb in mechanical contact with a bumper of the vehicle, the assembly being overmoulded with an element made of plastic material of the panel.

2. A panel according to claim 1, wherein the element made of plastic material comprises vertical ribs for strengthening the section.

3. A panel according to claim 1, wherein the section and the jamb are joined by clinching, welding or riveting.

4. A panel according to claim 2, wherein the section and the jamb are joined by clinching, welding or riveting.

* * * * *